Feb. 27, 1968  R. A. GIBBS ET AL  3,370,511

STEAM ENGINE

Filed May 5, 1966  2 Sheets-Sheet 1

INVENTORS
ROBERT A. GIBBS
THOMAS A. HOSICK

Feb. 27, 1968   R. A. GIBBS ET AL   3,370,511
STEAM ENGINE
Filed May 5, 1966   2 Sheets-Sheet 2
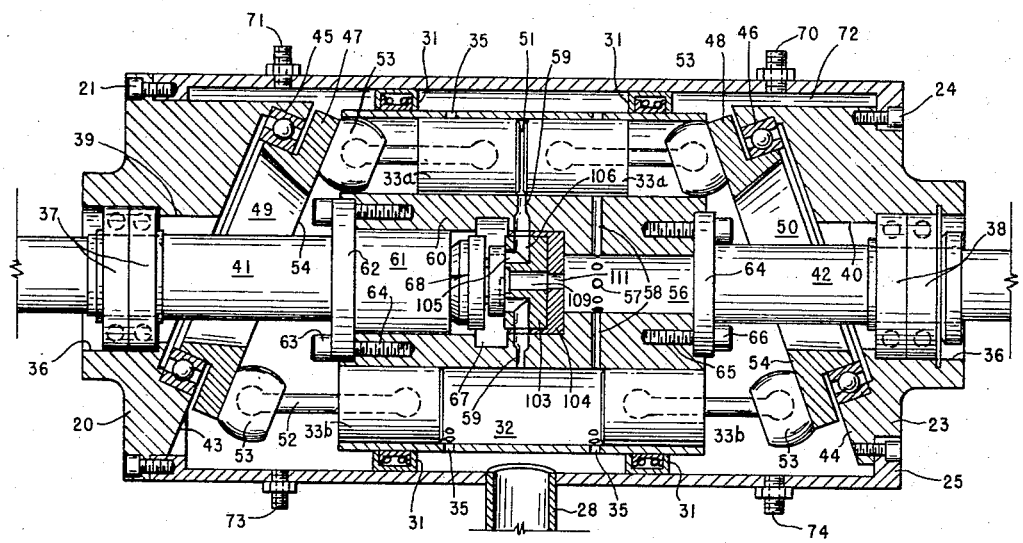
FIG.3
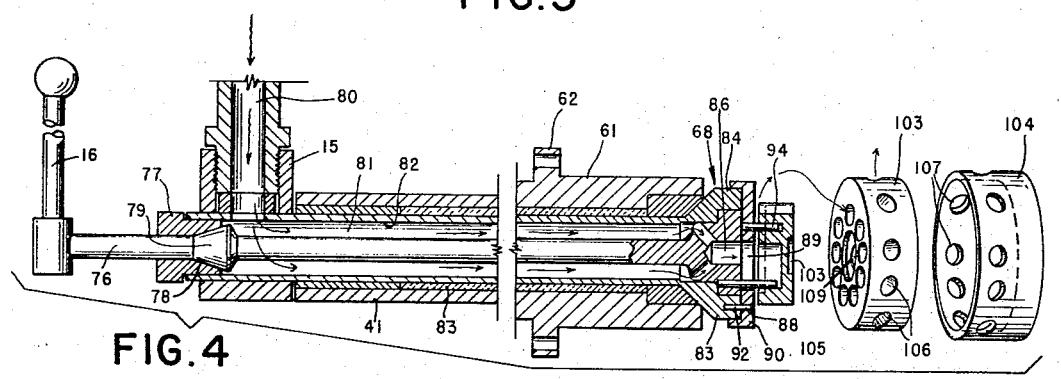
FIG.4
FIG.5   FIG.6
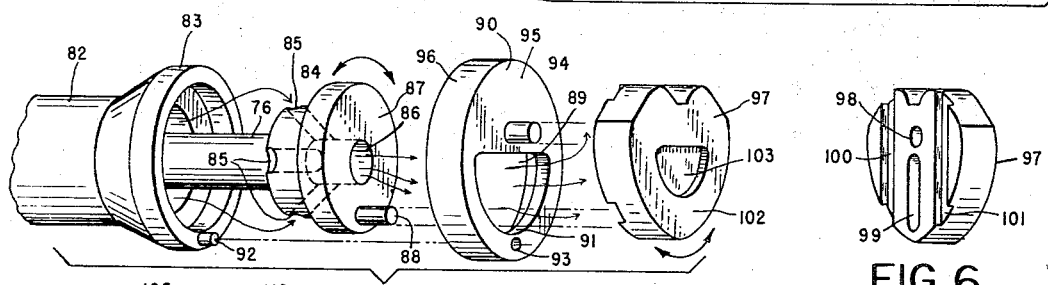
FIG.7a   FIG.7b
INVENTORS
ROBERT A. GIBBS
THOMAS A. HOSICK

United States Patent Office 3,370,511
Patented Feb. 27, 1968

3,370,511
STEAM ENGINE
Robert A. Gibbs, 2110 Rocky Knoll Road, Greensboro, N.C. 27406, and Thomas A. Hosick, 2024 Colonial Place, Winston-Salem, N.C. 27104
Filed May 5, 1966, Ser. No. 547,965
7 Claims. (Cl. 91—175)

This invention relates to steam engines and more particularly to a steam engine in which a rotary block supports a plurality of reciprocating opposed pistons that drive a power take-off shaft and a control valve assembly for admitting and exhausting steam to and from the cylinders that retain the opposed pistons.

Various types of steam engines have been employed for stationary and vehicular power plants as prime movers but such engines have not only been bulky, costly to operate and to maintain, but they are thermodynamically and mechanically inefficient. To overcome these and numerous other disadvantages of prior steam engines, the present invention for a rotary-type steam engine utilizes a compact rotary block rotatable about its longitudinal axis, supported for rotation in a suitable housing, in which block there are a plurality of longitudinally extending cylinders for cooperatively receiving and supporting a plurality of opposed pistons and guide members that are mounted on rotatable piston and guide member supporting plates. End closure members seal the ends of the engine housing with the inside faces of the closure members being oppositely inclined from each other for rotatably supporting, in an inclined position relative to the longitudinal axis of the block, one of the rotatable piston and guide member supporting plates. A power take-off shaft is securely fastened to one end of the block and extends through one of the rotatable piston and guide member supporting plates and the end closure member supporting such plate. A combination shaft and steam control valve mechanism is secured to the other end of the block, and like the power take-off shaft, is bearingly supported in the other end closure member after passing through the rotatable piston and guide member supporting plate. A steam control valve assembly is axially supported for introducing selectively steam into one or more cylinders for rotating the power take-off shaft in a clockwise or counterclockwise direction.

The many objectives and advantages of this invention will become more readily apparent to those knowledgeable and skilled in the art of steam engines and thermodynamics from the following detailed description taken in conjunction with the accompanying drawings in which like characters of reference designate corresponding parts throughout the several views, and wherein:

FIG. 3 is an enlarged partial longitudinal sectional view of FIG. 1 illustrating two pairs of opposed pistons in the extreme opposite steam inlet and exhaust positions;

FIG. 4 is an exploded enlarged partial longitudinal sectional view of the valve assembly mechanism, and a perspective view of the steam distribution disk and housing;

FIG. 5 is an enlarged and exploded perspective view of the steam inlet distribution valve assembly;

FIG. 6 is a rear perspective view of the cardioid valve plate; and

FIGS. 7a, 7b, 7c, and 7d are front elevational views of the steam distribution disk and the valve plate in several selected positions for rotation in one direction only.

Figure 1:
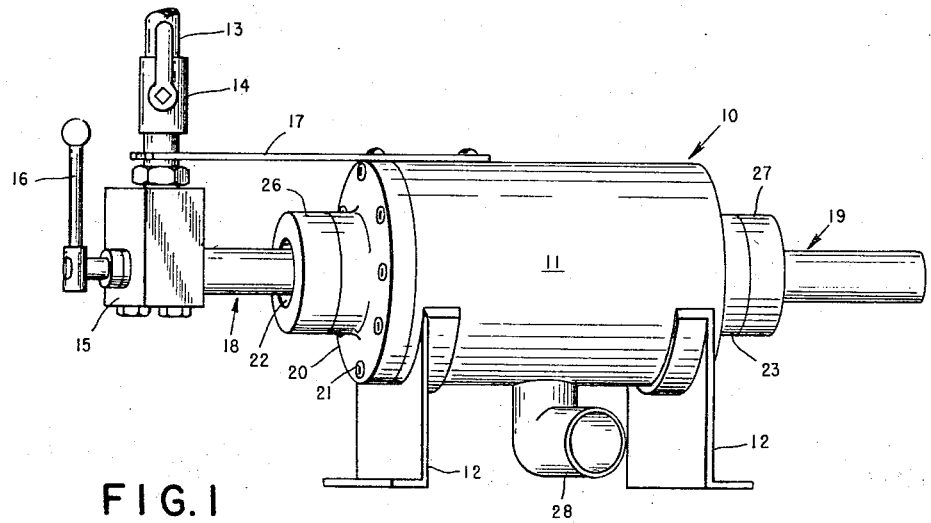
FIG. 1 is a front elevational and perspective view of the exterior of the steam engine embodying this invention.

Referring to the drawings and particularly to FIG. 1, there is illustrated a preferred embodiment of this invention for a steam engine 10 in which the engine housing 11 is supported horizontally by means of the brackets 12 that are spaced laterally from each other for fastening to a suitable base. The steam inlet line 13 in which there is a suitable cut-off valve 14, which valve may be replaced by a suitable pressure reducing valve or other suitable pressure regulating valve means, will receive, from a suitable source of steam supply, steam that is preferably under high pressure and temperature. The steam will flow into the inlet valve control housing 15 on which the operating throttle lever 16 is rotatably mounted. A horizontally extending bracket 17 is suitably fastened to the cylindrical surface of housing 11 at one end to restrain rotation of the housing 15 at the other end of the bracket by clamping it in the vertical position as shown. A combination tubular shaft, bearing and valve control assembly 18 extends into the housing 11 from the left end forming therein a passageway for the inlet steam from the inlet valve control housing 15. On the right end of the engine housing 11 and extending therefrom is the power take-off shaft and bearing assembly 19 which extends inwardly. Opposite ends of the housing 11 are closed by means of the left flanged closure head 20 which is securely fastened to the housing by means of suitable lugs 21 with the closure head being provided with an axial opening 22 through which the combination tubular shaft, bearing and valve control assembly extends. The right closure head 23 is securely fastened to the housing 11 by suitable fastening lugs 24 that pass through the depending skirt 25 on the right end of housing 11 as more clearly shown in FIG. 3. Suitable packing sleeves 26 and 27 are provided for each of the left and right flanged closure heads. A steam exhaust or vent line 28 is positioned at the lower end of the housing to exhaust the steam to the atmosphere.

Figure 2:
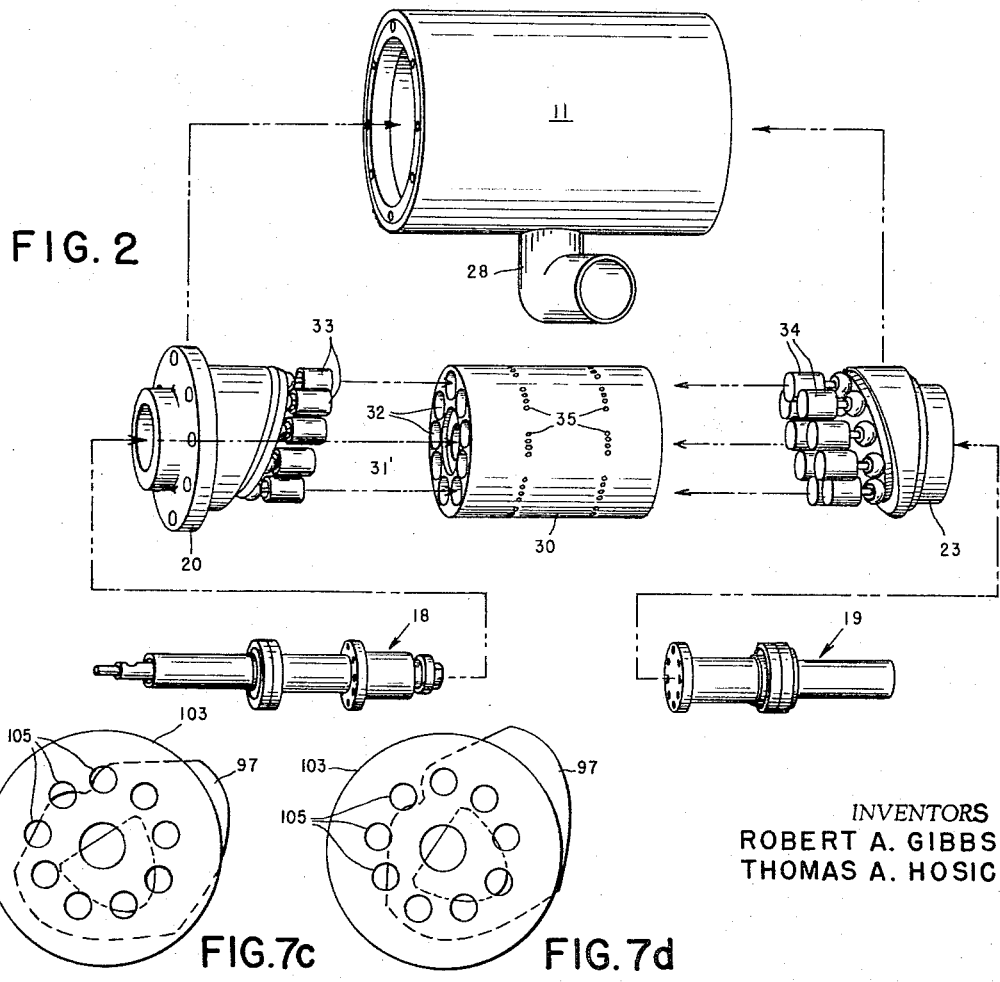
FIG. 2 is a partial exploded view of FIG. 1 illustrating, in perspective, various components, assemblies, valve mechanism and power take-off shaft removed from the steam engine housing with other external components illustrated in FIG. 1 being omitted.

A cylindrical piston-receiving block 30, as shown in FIGS. 2 and 3, is rotatably supported within housing 11 through the circumferential seals 31. The block 30 is provided with a stepped axial core 31' and a plurality of equispaced cylinders 32 (a total of nine is illustrated in the disclosed embodiment shown in FIG. 2) for cooperatively receiving therein opposed pistons 33 mounted on the left flanged closure head 20 from the left end of the block 30 and pistons 34 mounted on the right closure head on the left end of block 30. A series of exhaust ports communicates with each of the cylinders 32 with the exhaust ports 35 being arranged in two longitudinally spaced circumferential rows.

Each of the closure heads 20 and 23 is suitably bored to provide a bearing-receiving recess 36 in which the pairs of bearings 37 and 38 are seated together with any packing glands or materials. Additionally, the closure heads 20 and 23 are provided with axial cores 39 and 40 through which the tubular shaft 41 and the power take-off shaft 42, respectively, may pass. The interior faces 43 and 44 of the closure heads 20 and 23 are inclined symmetrically and recessed to receive cooperatively, in an inclined position, bearings 45 and 46. Piston-supporting and guide member plates 47 and 48 having shaft-receiving openings 49 and 50 therein are rotatably retained in the bearings 45 and 46 in an inclined position as shown in FIGS. 2 and 3. FIG. 3 illustrates two pairs of opposed pistons only, an upper pair 33a in the innermost extreme position for reception of steam into the cavity 51 formed between the inner portions of the pistons 33a. The other pair of pistons in the lower portion of FIG. 3a, shown as pistons 33b, present the pistons in the extreme outward steam exhaust position uncovering the exhaust ports 35 venting the cylinder 32. The connecting rod 52 for each piston is suitably connected at one end to the piston providing some pivotable movement with the other end of the connecting rod being securely fastened to a partial spherical member 53 that in turn is securely fastened to the inclined face 54 of the piston supporting and guide member supporting plates 47 and 48. As illustrated in FIG. 3, the spherical guide members 53 are at least partially introduced into the outer portions of the piston-receiving cylinders 32 thereby providing suitable means for timing and torque transmission between the pistons and guide members, and the block 30.

The interior of the cylindrical piston-receiving block is shown more clearly in FIG. 3 which has heretofore been described as containing a stepped axial core 22 and in which there is an exhaust steam cylindrical cavity 56 from which cavity radiate exhaust ports 57 which communicate through passageways 58 with the cylinders 32, the purpose for which will be described hereafter. Individual cylinder inlet passages 59 extend radially through the block to permit the passage of high pressure steam into the cylinders at the control of the inlet valve control mechanism and lever 16. The axial recess 60 will cooperatively receive and retain therein the tubular enlarged shaft portion 61 that is retained by the flanged collar 62 which in turn is securely fastened by means of the lugs 63 to the threaded openings 64 in the left end of the block 30 for securely retaining the combination tubular shaft, bearing and valve control assembly 18 in position. The take-off shaft 42 is also provided with a flanged collar 64 that is securely fastened to the threaded openings 65 in the block by means of the lugs 66. As will be apparent, rotation of the block 30 will also rotate the power take-off shaft 42 and the tubular shaft 41. The central enlarged cavity 67 in the block 30 will receive therein the valve control mechanism 68 to be more explicitly described hereafter. Suitable inlet lubrication fittings 70 and 71 are provided for introducing a suitable lubricant into the cavity 72 provided within the housing 11 and around the various assemblies and components enabling the bearings, pistons, guide members, and other components to be lubricated at required intervals with suitable drain openings 73 and 74 provided in the base of the housing. The lubricant inlet and drain fittings have been omitted from FIG. 1 but are shown in FIG. 3.

The valve control mechanism and assembly 68 is more clearly shown in FIGS. 4, 5 and 6 taken in conjunction with the orientation illustrated in FIG. 3. Lever 16 is connected to the elongated rod 76 that extends longitudinally through the packing nut 77 in the end of the inlet valve control housing 15 and is provided with a conical seat 78 for seating the frusto-conical enlargement 79 on the rod 76. The inlet steam will pass through the passageway 80 mounted on the housing 15 into the annular cavity 81 provided through the line 82 that is bearingly supported to the suitable bearing surfaces 83 within the rotatable sleeve 41. The inner end of the line 82 is provided with a bell-shaped opening 83 for cooperatively receiving the steam inlet cap 84 that is securely retained on the end of rod 76 and is provided with circumferentially spaced and inwardly inclined steam passageways 85 which communicate with the axial opening 86. The forward face 87 of cap 84 is provided with a valve plate pivot pin 88 which will pass through the U-shaped opening 89 in the valve disk 90 and be guidably trained on the track perimeter 91 thereof. The pin 92 projecting from the end of bell 83 will cooperatively receive and retain the disk 90 in position upon registry of the pin 92 within the recess 93 permitting the steam to pass through the opening 86 into the U-shaped cavity 89. A pivot pin 94 is securely fastened on the front face of the disk 95 of disk 90 with the extending skirt 96 at least partially circumscribing the perimeter of cap 84, substantially as shown in FIG. 4.

A cardioid valve plate 97 is pivotally mounted on the pivot pin 94 which is cooperatively received in the pivot pin receiving opening 98 on the rear surface of the valve plate 97. The valve plate actuating pin 88 is cooperatively received in the elongated slot 99 at the rear of the valve plate 97 which plate will be responsive to rotation of the rod 76 through the lever 16 enabling steam passing through the U-shaped cavity 89 to urge the cardioid valve plate 97 to the right, as shown in FIG. 3, permitting the steam to pass into the chamber 67 through the vertical slots 100 and 101 in valve plate 97. The forward face 102 of valve plate 97 is provided with a U-shaped exhaust steam cavity 103 which will be described hereafter. Steam entering the cavity 67 will pass to the passageway 59 leading to one or more cylinders 32 through the cylinder port selection disk 103 that is retained within the disk-receiving sleeve 104. The disk 103 is provided with a plurality of spaced-apart steam-receiving openings 105, each of which has a corresponding exit port 106 that communicates with a passageway 59 leading to a cylinder 32. The openings 107 in sleeve 104 register with the openings 106 in disk 103. Additionally, disk 103 is provided with a central opening 109 which has an enlarged outer portion that will communicate with the U-shaped exhaust steam cavity 103 in valve plate 97, as more clearly shown in FIG. 3.

Figures 7C, 7D:
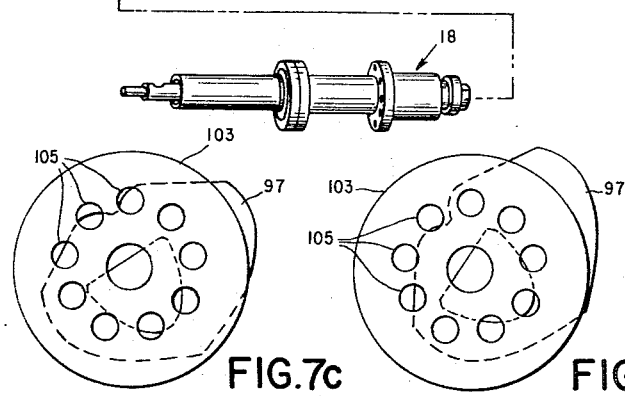

In FIGS. 7a, 7b, 7c and 7d, there are shown four separate positions which may be utilized in the operation of the valve control mechanism by shifting or pivoting the cardioid valve plate 97 to the desired position depending upon the output requirements of the steam engine. For example, in FIG. 7a, the indentation 110 in the valve plate exposes the uppermost port 105 permitting steam to flow from chamber 67 into the port 105, through opening 106 into the passage 59 where it will be introduced into the upper cylinder 32 where the pistons 33a are substantially adjacent to each other thereby urging them to separate and commence to revolve the block 30 within the housing 11. For increased load and speed, the control lever 16 may be rotated further to expose a second inlet port 105 as shown in FIG. 7b to increase the volume of steam entering into at least two of the cylinders. In FIG. 7c, the valve plate 97 is tilted or pivoted counter-clockwise exposing a greater distance exposing three ports 105 to the steam within the chamber 67 enabling the steam to pass into three of the cylinders at the same time as the rotor 30 revolves continuously in one direction of rotation. Further increased steam supply to the cylinders will occur when the valve plate 97 assumes a position as shown in FIG. 7d opening a series of three ports 105 to the supply of steam. For a reversal of direction, lever 16 may be rotated in an opposite direction thereby pivoting the valve plate 97 in a clockwise direction in order to reverse the direction of the rotor block rotation and accordingly the direction of rotation of the power takeoff shaft 42.

In order to relieve the back pressure when the pistons 33 return from the position shown by the pistons 33b to the position shown by the pistons 33a in FIG. 3, and after some of the steam has been exhausted from the cylinder 32 through the vents 35, the pistons will close the vents 35 thereby developing a back pressure. This back pressure will be released or vented through the same steam inlet passages 59, obviously when they are not used to admit steam, back through the radially extending ports 106 in disk 103 and the ports 105 therein which ports 105 will communicate with the U-shaped exhaust recess 103 in the front face 102 of the valve plate 97 as shown in FIG. 3. Steam being exhausted from the cavity 103 will pass axially through the opening 109 in disk 103 which communicates with the opening 111 in the sleeve 104 to discharge the steam into the axial cavity 56 wherein the steam will then pass through at least one of the ports 57 and passages 58 to an open or atmospherically vented cylinder, such as 32. Actually, several cylinders may be developing a back pressure as the cylinders return from their extreme positions thereby permitting the exhaust steam from each cylinder to pass through the passages 59, ports 106 and 105 into the cavity 103 and through the axial openings 109 and 111 for discharge through one of the ports 57 in the cavity 56 through a vented passage 58 as shown.

In operation, preferably high pressure and superheated steam will be admitted through the inlet steam supply line 13 to pass through the control housing 15 to be introduced into the rotatable block cylinders 32 through the valve plate 97, depending upon its position, enabling the steam to pass through a predetermined number of ports in the disk 103 and sleeve 104 for introduction through passage 59 into a cylinder 32 to expand and force the pistons 32a apart longitudinally thereby commencing the rotation of the block 30 within the housing 11. The spherically-shaped members 53 will guide and restrain skewing displacement of the pistons and permit the rotor to revolve within the housing to drive the power take-off shaft 52 which may be connected to any unit to be driven. Reversal of the direction of rotation of the block will occur simply by rotating the throttle lever 16 in an opposite direction to cause the valve plate 97 to pivot in an opposite direction from the direction in which it has been positioned with a minimum of delay.

It will be readily apparent that many modifications and variations may be made to the valve structure, the connecting members to the pistons, the end supporting plates and the exhaust system without departing from the purpose and spirit of this invention and without limiting this invention to the specific described embodiment, and such modifications and variations are contemplated within the scope of the appended claims.

What is claimed is:

1. A steam engine comprising: a housing, a rotatable block mounted in said housing having a plurality of piston-receiving cylinders and an axial core, closure heads one at each end of said housing, each of said heads having an axial opening in alignment with said block core, a pair of opposed symmetrically inclined piston-supporting members revolvably mounted one on each head, each of said members having a plurality of pistons pivotally supported thereon and receivable in said piston-receiving cylinders of said block, means for guidably restraining lateral piston movement, said pistons on one member being displaced in unison and in a direction opposite from said pistons on the other member, a power take-off shaft secured to said block, means for controlling the admission of steam into said cylinders for piston reciprocation to revolve said block within the housing in a clockwise or counterclockwise direction, and means for reducing back pressure against at least some of said pistons after initially exhausting a cylinder.

2. A steam engine as claimed in claim 1, said steam control means including a valve plate and assembly for selectively introducing steam into at least one cylinder.

3. A steam engine as claimed in claim 1, said steam control means including a combination tubular shaft and valve control assembly, and a steam distribution disk for passing steam to at least one cylinder and exhausting steam from at least another cylinder.

4. A steam engine as claimed in claim 1, said block having ports leading to each of said cylinders, said steam control means including a movable valve plate and a steam distribution disk for passing steam to at least one cylinder to urge opposed pistons apart, and means for receiving and venting back pressure as opposed pistons converge.

5. A steam engine as claimed in claim 1, said steam control means including a conduit for passing steam therethrough, said conduit being supported axially on said block, a control lever and rod supported by said conduit, a valve operable by said lever and rod to control the distribution of steam, means for distributing the steam to said cylinders, an exhaust steam cavity in said block having a passage to each cylinder, and means for venting a plurality of cylinders through said cavity and passages.

6. A steam engine as claimed in claim 1, said piston-supporting members being inclined toward each other controlling the displacement of said opposed pistons relative to each other for maximum outward displacement and inward steam-receiving positions.

7. A steam engine as claimed in claim 1, said steam control means including a steam conduit, a lever operated rod for controlling the distribution of steam from said conduit, a cardioid valve plate pivotally supported to distribute steam, said plate being supported on said rod, a steam distribution disk contiguous with said valve plate and having combination inlet and discharge ports, steam passages communicating with said distribution disk leading to and from each cylinder, and means for venting each cylinder communicating with said distribution disk whereby a plurality of cylinders may be exhausted simultaneously through at least one cylinder in which opposed pistons are displaced to their maximum displacement.

References Cited

UNITED STATES PATENTS 2,957,462  10/1960  Clark _____ 91—175
3,135,166  6/1964   Born _____ 91—175

FOREIGN PATENTS 292,290  6/1928  Great Britain.

MARTIN P. SCHWADRON, *Primary Examiner.*

P. E. MASLOUSKY, *Assistant Examiner.*